（12）United States Patent
Jang

(10) Patent No.: US 11,628,971 B2
(45) Date of Patent: Apr. 18, 2023

(54) ANTI-VIBRATION PALLET

(71) Applicant: KOREA RAILROAD RESEARCH INSTITUTE, Uiwang-si (KR)

(72) Inventor: Seung-Ho Jang, Gunpo-si (KR)

(73) Assignee: Korea Railroad Research Institute, Uiwang-si (KR)

( * ) Notice: Subject to any disclaimer, the term of this patent is extended or adjusted under 35 U.S.C. 154(b) by 140 days.

(21) Appl. No.: 17/413,065

(22) PCT Filed: May 3, 2021

(86) PCT No.: PCT/KR2021/005550
§ 371 (c)(1),
(2) Date: Jun. 11, 2021

(87) PCT Pub. No.: WO2022/014832
PCT Pub. Date: Jan. 20, 2022

(65) Prior Publication Data
US 2022/0306338 A1 Sep. 29, 2022

(30) Foreign Application Priority Data

Jul. 13, 2020 (KR) .................. 10-2020-0086300

(51) Int. Cl.
*B65D 19/38* (2006.01)
*B65D 19/00* (2006.01)
(52) U.S. Cl.
CPC ......... *B65D 19/38* (2013.01); *B65D 19/0012* (2013.01); *B65D 2519/00273* (2013.01);
(Continued)

(58) Field of Classification Search
CPC .................. B65D 19/38; F16F 15/04
(Continued)

(56) References Cited

U.S. PATENT DOCUMENTS 1,812,861 A * 7/1931 Chase .................. B62B 3/0625
108/136
5,100,096 A * 3/1992 Mizuno .................. B65D 81/07
248/630
(Continued)

FOREIGN PATENT DOCUMENTS

KR 101753044 B1 7/2017
KR 101808041 B1 12/2017
(Continued)

*Primary Examiner* — Jose V Chen
(74) *Attorney, Agent, or Firm* — Rabin & Berdo, P.C.

(57) ABSTRACT

Proposed is an anti-vibration pallet. More particularly, the present disclosure relates to an anti-vibration pallet that is capable of realizing an effect of an air spring by using only a combination of an auxiliary mount and a main mount that are formed of elastic bodies provided between an upper plate and a lower plate, and is also capable of maximizing an anti-vibration performance by controlling an optimal anti-vibration load according to a cargo load. In order to achieve the objectives described above, the present disclosure includes: an upper plate on which cargo is loaded on a top portion thereof; a lower plate positioned below the upper plate; a main mount installed between the lower plate and the upper plate; and an auxiliary mount installed outside the main mount.

10 Claims, 15 Drawing Sheets

(52) U.S. Cl.
CPC .............. *B65D 2519/00288* (2013.01); *B65D 2519/00318* (2013.01); *B65D 2519/00378* (2013.01); *B65D 2519/00776* (2013.01)

(58) Field of Classification Search
USPC ........................................ 108/57.12; 248/638
See application file for complete search history.

(56) References Cited

U.S. PATENT DOCUMENTS

| | | | | |
|---|---|---|---|---|
| 5,505,140 | A * | 4/1996 | Wittmann | B65D 19/38 |
| | | | | 108/51.11 |
| 6,418,862 | B1 * | 7/2002 | Heil | B65D 19/0028 |
| | | | | 108/57.12 |
| 6,598,545 | B2 * | 7/2003 | Ryaboy | G01M 11/04 |
| | | | | 108/136 |
| 7,637,219 | B2 * | 12/2009 | Hartel | B65D 19/40 |
| | | | | 108/51.11 |
| 8,480,052 | B2 * | 7/2013 | Taylor | G06F 1/187 |
| | | | | 267/152 |
| 8,511,637 | B2 * | 8/2013 | Mitsch | F01D 25/28 |
| | | | | 248/677 |
| 8,991,780 | B2 * | 3/2015 | Pedersen | B65D 90/0033 |
| | | | | 206/521 |
| 9,272,657 | B1 * | 3/2016 | Perciballi | B60P 7/18 |
| 9,630,550 | B1 * | 4/2017 | Perciballi | B60P 7/13 |
| 2002/0104950 | A1 * | 8/2002 | Mayama | F16F 7/1005 |
| | | | | 414/935 |
| 2007/0221102 | A1 * | 9/2007 | Reinhall | B65D 19/0073 |
| | | | | 108/57.12 |
| 2009/0000526 | A1 * | 1/2009 | Looker | B65D 88/12 |
| | | | | 220/1.5 |
| 2010/0294174 | A1 * | 11/2010 | Cummins | F16F 9/54 |
| | | | | 267/136 |
| 2010/0294175 | A1 * | 11/2010 | Cummins | F16F 9/54 |
| | | | | 29/428 |
| 2014/0086718 | A1 * | 3/2014 | Bush | B65D 19/0073 |
| | | | | 414/800 |
| 2014/0090581 | A1 * | 4/2014 | Schultz | B65D 19/0095 |
| | | | | 248/634 |
| 2014/0091196 | A1 * | 4/2014 | Maas | B65D 19/38 |
| | | | | 248/550 |
| 2014/0367547 | A1 * | 12/2014 | Ohnishi | F16F 1/3835 |
| | | | | 267/141 |
| 2016/0023803 | A1 * | 1/2016 | Green | B65D 19/0095 |
| | | | | 108/57.12 |
| 2016/0061285 | A1 * | 3/2016 | Green | B65D 19/0028 |
| | | | | 267/141 |
| 2017/0107013 | A1 * | 4/2017 | Yoshifusa | B65D 19/0069 |
| 2021/0221559 | A1 * | 7/2021 | Wakimoto | B65D 19/20 |
| 2022/0029560 | A1 * | 1/2022 | Green | B65D 19/38 |
| 2022/0306338 | A1 * | 9/2022 | Jang | B65D 19/38 |

FOREIGN PATENT DOCUMENTS

| | | |
|---|---|---|
| KR | 102001023 B1 | 7/2019 |
| KR | 1020190134333 A | 12/2019 |

* cited by examiner

ANTI-VIBRATION PALLET

TECHNICAL FIELD

The present disclosure relates to an anti-vibration pallet. More particularly, the present disclosure relates to an anti-vibration pallet that is capable of realizing an effect of an air spring by using only a combination of an auxiliary mount and a main mount that are formed of elastic bodies provided between an upper plate and a lower plate, and is also capable of maximizing an anti-vibration performance by controlling an optimal anti-vibration load according to a cargo load.

BACKGROUND ART

Generally, pallets are pedestals on which a variety of cargoes are loaded to carry the cargoes by using a forklift or the like, and generally formed in a quadrangle plate shape and manufactured by using a wood material, a synthetic resin material, or a metal material such as aluminum.

However, though conventional pallets can realize excellent structural strength for stably carrying a load, there is a problem in that damage to the load caused by vibration that is applied to the load loaded on the pallet occurs when the pallet is moved, so that continuous research and development to solve the problem is required.

In order to prevent the vibration, an anti-vibration mount is installed. In a case of conventional anti-vibration mount installed at a path where vibration and shock are transferred, a coil spring, a leaf spring, an anti-vibration rubber, an air spring, or the like has been used, and these support a subject (hereinafter referred to as a subject body) and perform functions supporting a load and blocking vibration/shock.

A performance of these anti-vibration apparatus is associated with a stiffness, a damping value, and a mass of cargo. Particularly, a lower bound in a low frequency of frequency bands generating a vibration reduction is proportional to a square root of stiffness and is inversely proportional to a square root of mass.

Therefore, a change occurs in the anti-vibration performance when a weight of the subject body changes, and the lower bound in the low frequency increases when the stiffness increases to support a load, so that there is a problem in that it is difficult to reduce low frequency vibration or shock.

In addition, when a mount having a low stiffness is used to reduce low frequency vibration/shock, it is required to exceedingly increase a height of the mount due to a high amount of deflection thereof. In this case, a space occupied by an anti-vibration mount is excessive, so that it is difficult to apply the anti-vibration mount practically.

These situations occur in mounts made of a coil spring, a leaf spring, and an anti-vibration rubber.

On the other hand, in a case of an air spring mount using air pressure, it is easy to block vibration/shock while supporting a sprung mass (weight). FIG. 1 is a view illustrating load-displacement characteristics of a conventional air spring mount, and a slope of a load-displacement graph indicates a stiffness. In the load-displacement graph, starting from zero magnitude of a load, the stiffness is high in an initial state, but decreases when it reaches a working region, and increases again when it exceeds the working region.

Therefore, it is possible to support a high load with excellence in low frequency anti-vibration performance because of having a low stiffness in the working region.

Such an air spring generates an air pressure by operating an air compressor from electrical or engine power, and can adjust a supporting load (corresponding to a load in the working region in the graph) by adjusting the air pressure.

On the other hand, the air has a possibility of being leaked, so that the air compressor needs to be operated and replenish an air when the air pressure decreases below a predetermined level.

Therefore, in order to use the air spring, a structure is complex and maintenance is difficult due to additional components such as a compressor, an accumulator, an air valve block, and so on, since the air spring needs an external operating power, and also there are problems in that a manufacturing cost is high and a durability of a deterioration of an air hose, a bellows rubber, and so on is relatively poor.

In addition, as described above, the air spring has the complex structure and has too large of a volume, so there is a problem in that it is difficult to apply the air spring to a pallet.

DISCLOSURE

Technical Problem

Accordingly, the present disclosure has been made keeping in mind the above problems occurring in the related art, and an objective of the present disclosure is to provide an anti-vibration pallet in which the anti-vibration pallet is provided with a main mount at a center portion between an upper plate and a lower plate that configure a pallet, and a plurality of auxiliary mounts are provided outside the main mount, the anti-vibration pallet being capable of realizing an effect of an air spring by using only a combination of the auxiliary mount and the main mount that are formed of elastic bodies by allowing the main mount to change a direction and a magnitude of an elastic force that is applied to an elevation block that is changing a height thereof depending on a compression degree of the auxiliary mount.

In addition, according to another objective of the present disclosure, the present disclosure is to provide an anti-vibration pallet capable of maximizing an anti-vibration performance by controlling an optimal anti-vibration load according to a cargo load by controlling a height of an upper block by using an upper portion of an adjusting bolt rotatably installed to a lower block and screwed vertically through the upper block, and in which the elevation block configured to be movable vertically with the upper plate configuring the main mount includes the upper block and the lower block, and the upper block is coupled to the upper plate and the lower block is coupled to a main elastic unit.

Technical Solution

In order to achieve the objectives described above, the present disclosure includes: an upper plate on which cargo is loaded on a top portion thereof; a lower plate positioned below the upper plate; a main mount installed between the lower plate and the upper plate; and an auxiliary mount installed outside the main mount.

Here, the main mount may include: a support frame installed on a top portion of the lower plate; an elevation block installed below the upper plate; a support bracket protruding upward from each of opposite sides of the support frame; and a main elastic unit having a center portion hinge-coupled to an end portion of the support bracket and having a first end portion hinge-coupled to a side portion of the elevation block.

Here, the main elastic unit may include a plurality of main elastic units that are installed symmetrically with respect to the elevation block.

Here, the main elastic unit may include: an elastic support member hinge-coupled to the support bracket; a main elastic body positioned at an elastic body accommodating portion that is formed inside the elastic support member; an elastic guide installed through both the elastic body accommodating portion and the main elastic body; a second hinge bracket formed at a first end portion of the elastic guide and hinge-coupled to a first hinge bracket that is protruding from the side portion of the elevation block; and a flange formed below the second hinge bracket and configured to support a first end portion of the main elastic body.

Here, a nut accommodating recess may be formed on a top portion of the elevation block and may receive therein a nut that is screwed to the upper plate such that the nut may be horizontally movable in the recess, and a rubber bushing may be provided outside the nut.

Meanwhile, the elevation block may include: a lower block on which the first hinge bracket is formed on each of opposite sides thereof; an upper block provided at an upper portion of the lower block and configured to be movable vertically; and an adjusting bolt rotatably installed at the lower block and screwed to the upper block so as to control a height of the upper block.

Here, a block accommodating portion in which a center portion of the upper block is inserted to be movable vertically may be formed at a center portion of the lower block, and a guide groove to which each of opposed side wall surfaces of the block accommodating portion is inserted may be formed in a vertical direction at each side of the center portion of the upper block.

In addition, an elevation guide inserted inside the upper block may be provided on a top surface of the support frame, a guide protrusion protruding outward may be formed on an upper end of the elevation guide, and a guide hole having a long hole shape to which the guide protrusion is inserted may be formed through each of opposite sides of the elevation block.

In addition, a guide rod may protrude downward from each of opposite sides of the elevation block, and a guide member to which the guide rod is slidably inserted may protrude upward from a top surface of the support frame.

Here, the auxiliary mount may include: an auxiliary elastic body configured to elastically support the upper plate; an upper fixing member installed at an upper portion of the auxiliary elastic body and fixed to a bottom surface of the upper plate; and a lower fixing member installed at a lower portion of the auxiliary elastic body and fixed to a top surface of the lower plate.

In addition, a main cover and an auxiliary cover may be installed at a lower surface of the upper plate such that the main cover and the auxiliary cover are positioned outside the main mount and the auxiliary mount, respectively.

Advantageous Effects

According to the present disclosure, the main mount is provided at a center portion between the upper plate and the lower plate that are configuring a pallet, and a plurality of the auxiliary mounts are provided outside the main mount, in which the auxiliary mount acts an elastic force upwardly, and in which the main mount has an effect that is capable of realizing an effect of an air spring by using only a combination of the auxiliary mount and the main mount that are formed of elastic bodies by allowing the main mount to change a direction and a magnitude of an elastic force that is applied to the elevation block that changes a height thereof depending on a compression degree of the auxiliary mount.

In addition, according to the present disclosure, the elevation block configured to move vertically with the upper plate configuring the main mount includes the upper block and the lower block, in which the upper block is coupled to the upper plate and the lower block is coupled to the main elastic unit. Therefore, by controlling a height of the upper block by using an upper portion of the adjusting bolt rotatably installed to the lower block and screwed vertically through the upper block, there is an effect capable of maximizing an anti-vibration performance by controlling an optimal anti-vibration load according to a cargo load.

BEST MODE

Figure 1:
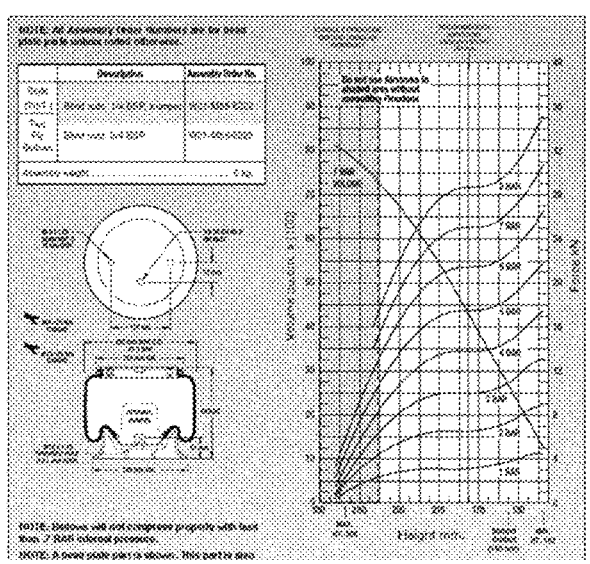
FIG. 1 is a view illustrating load-displacement characteristics of a conventional air spring mount.

Hereinafter, embodiments of the present disclosure will be described in detail with reference to the accompanying drawings. The same reference numerals in the drawings denote the same elements, and repetitive description of the same elements is omitted. In addition, it should be understood that the embodiment of the present disclosure may be changed to a variety of embodiments and the scope and spirit of the present disclosure are not limited to the embodiment described hereinbelow.

Figure 2:
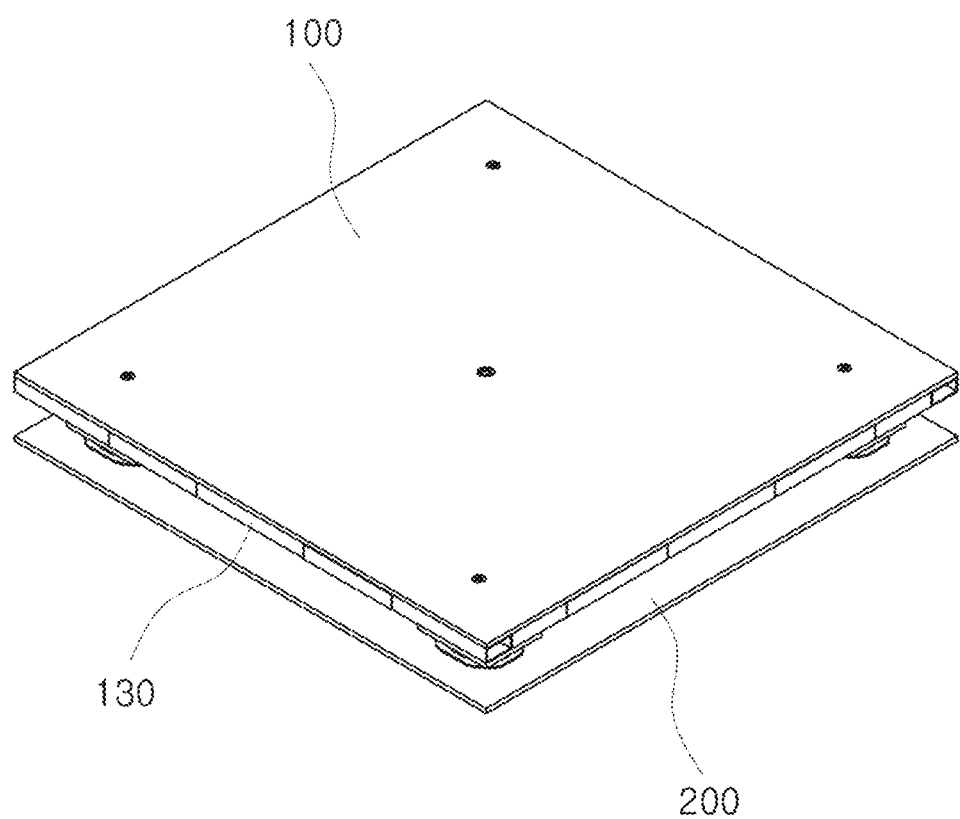
FIG. 2 is a perspective view illustrating an anti-vibration pallet according to the present disclosure.
Figure 3:
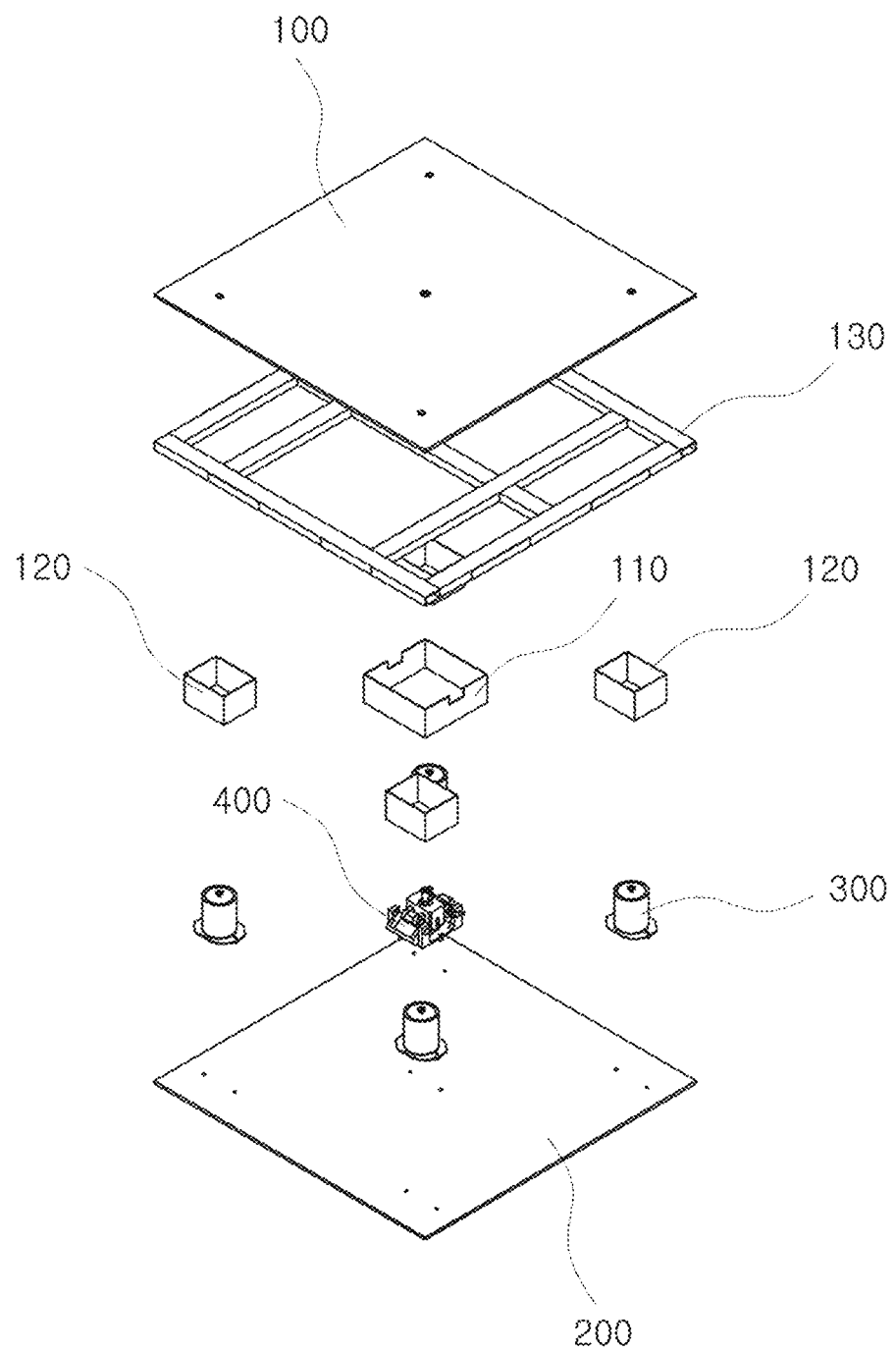
FIG. 3 is an exploded perspective view illustrating the anti-vibration pallet according to the present disclosure.
Figure 4:
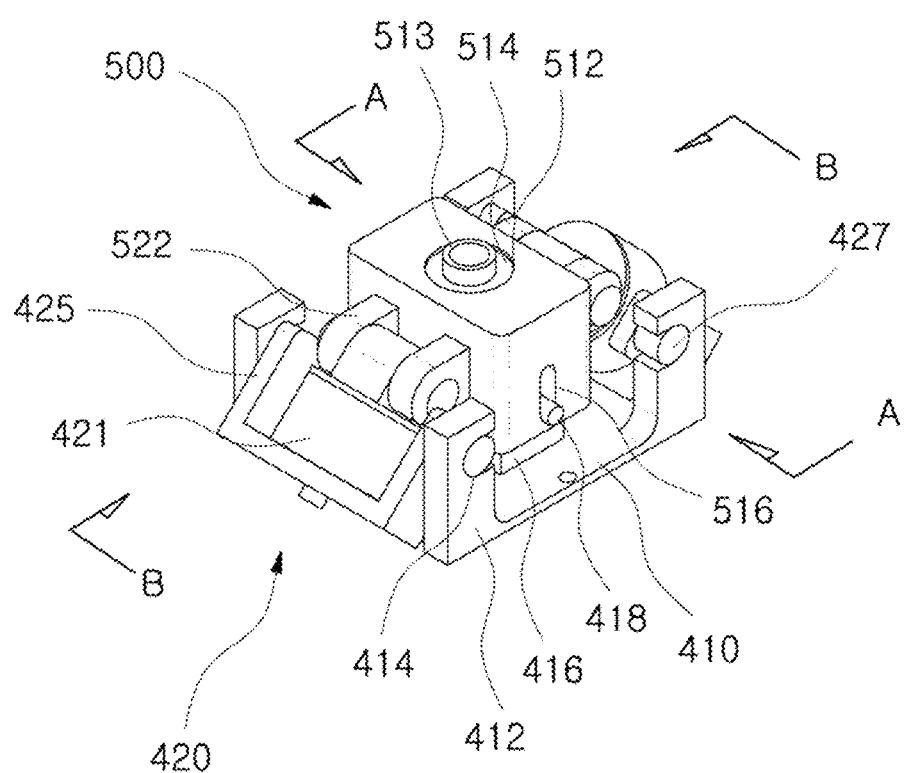
FIG. 4 is a perspective view illustrating a main mount of the anti-vibration pallet according to an embodiment of the present disclosure.
Figure 5:
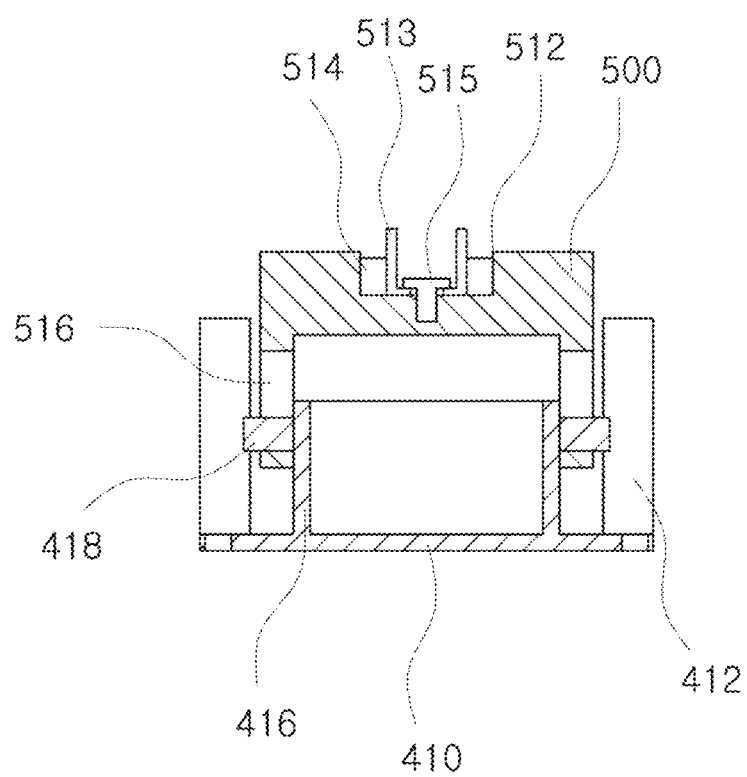
FIG. 5 is a cross-sectional view taken along line A-A in FIG. 4.
Figure 6:
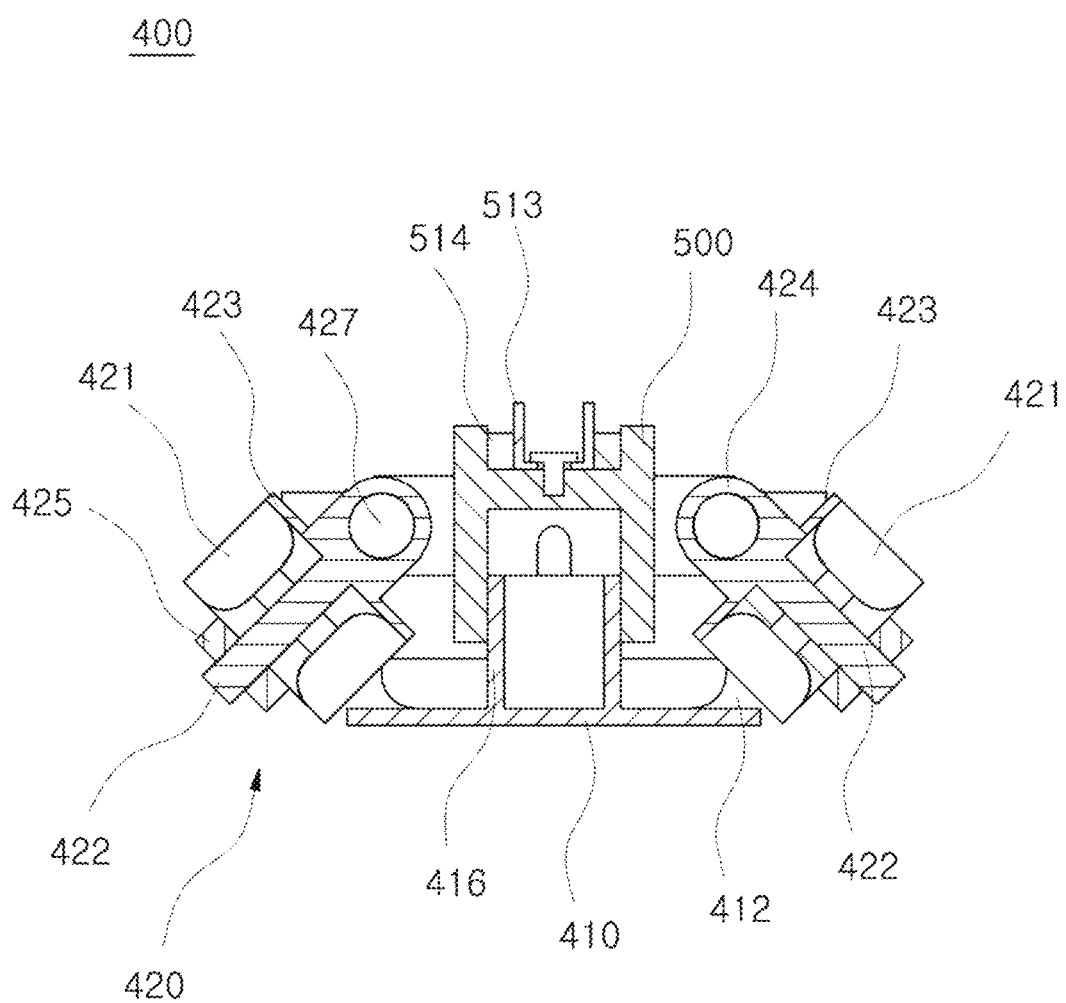
FIG. 6 is a cross-sectional view taken along line B-B in FIG. 4.
Figure 7:
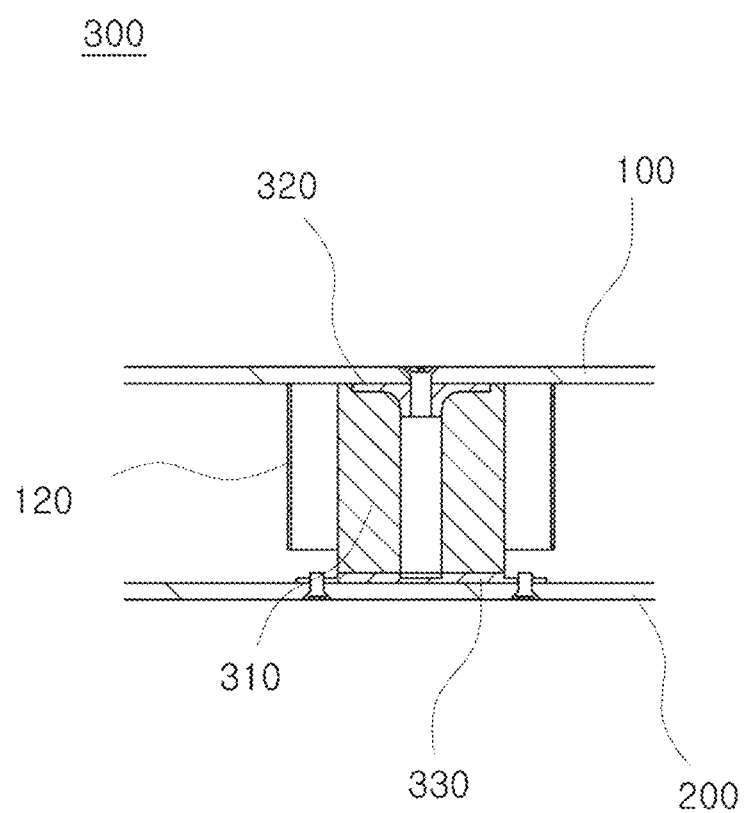
FIG. 7 is a cross-sectional view illustrating an auxiliary mount of the anti-vibration pallet according to the present disclosure.
Figure 8A:
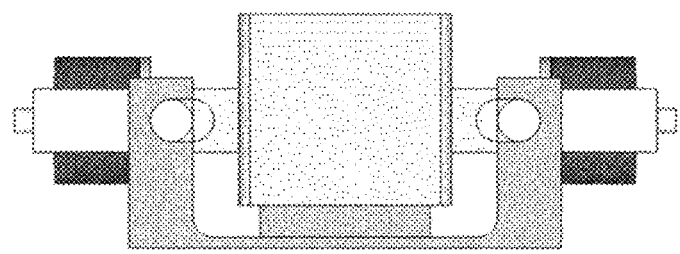
FIGS. 8A and 8B are views illustrating a state in which the main mount of the anti-vibration pallet according to the present disclosure is moved downward by a load.
Figure 8B:
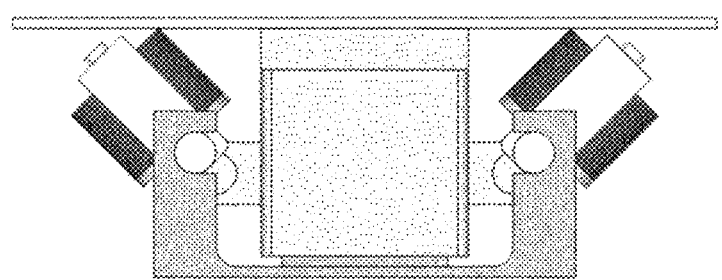
Figure 9:
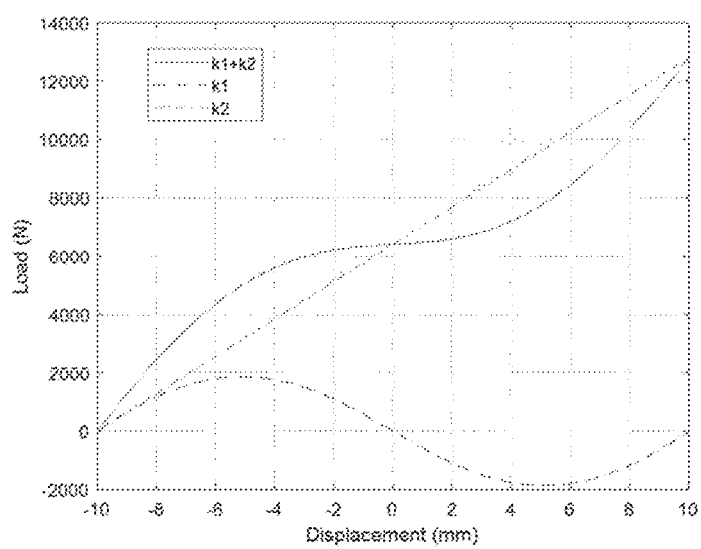
FIG. 9 is a load-displacement graph of the anti-vibration pallet according to the present disclosure.
Figure 10:
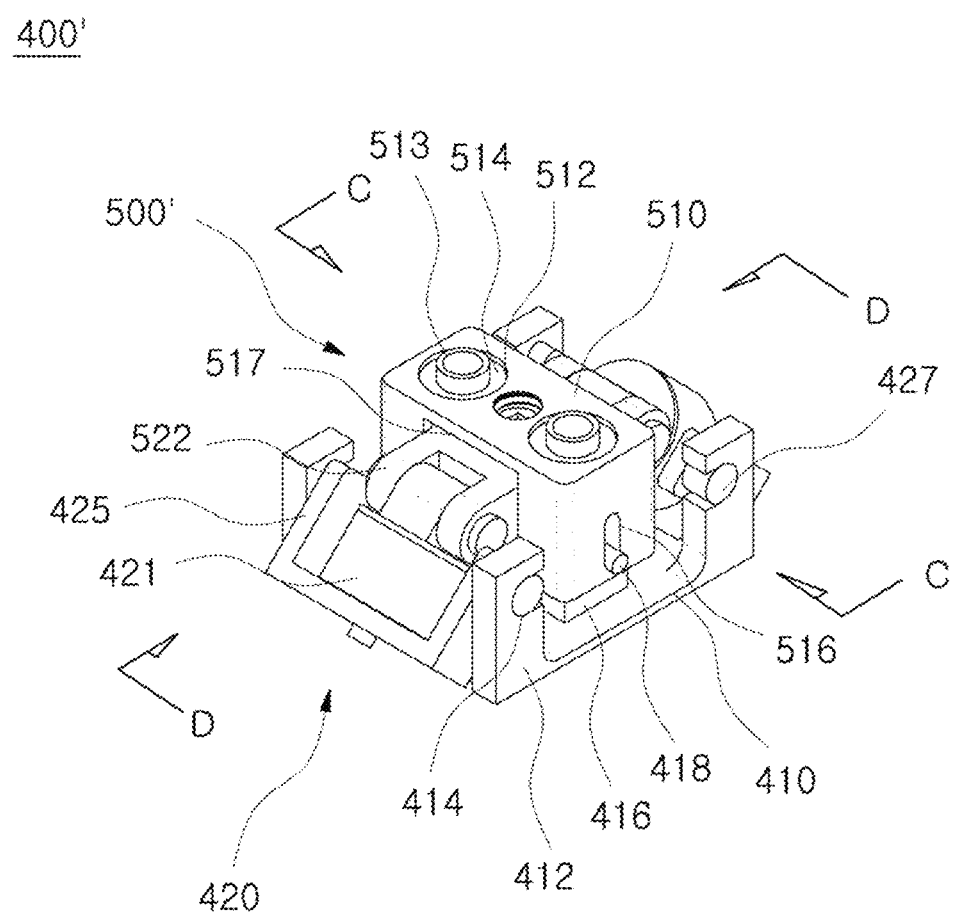
FIG. 10 is a perspective view illustrating a main mount according to another embodiment of the present disclosure.
Figure 11:
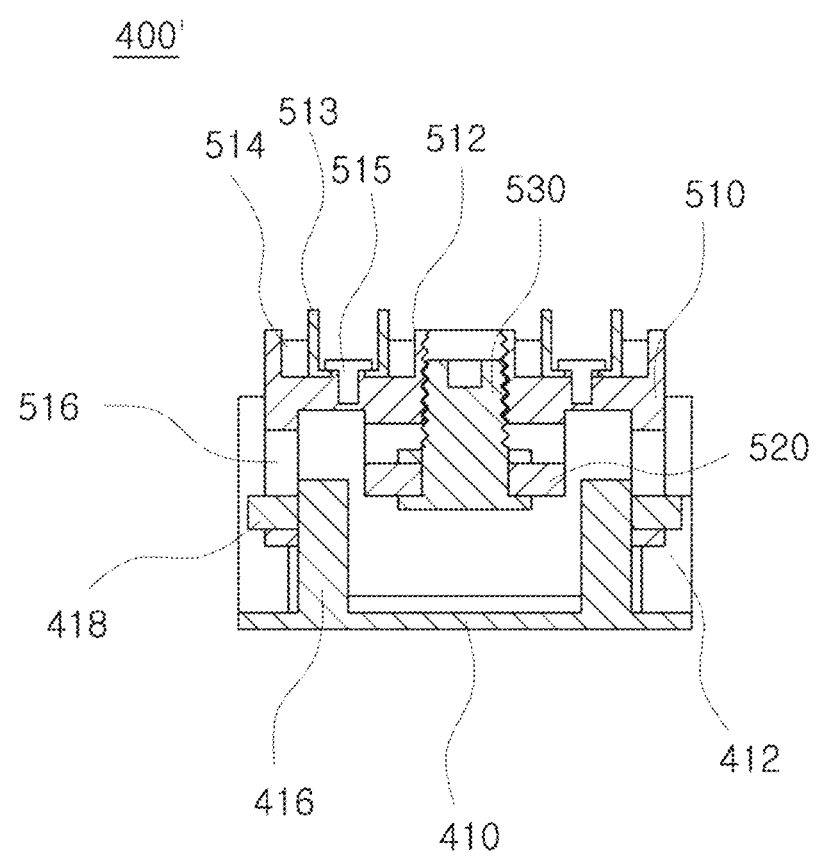
FIG. 11 is a cross-sectional view taken along line C-C in FIG. 10.
Figure 12:
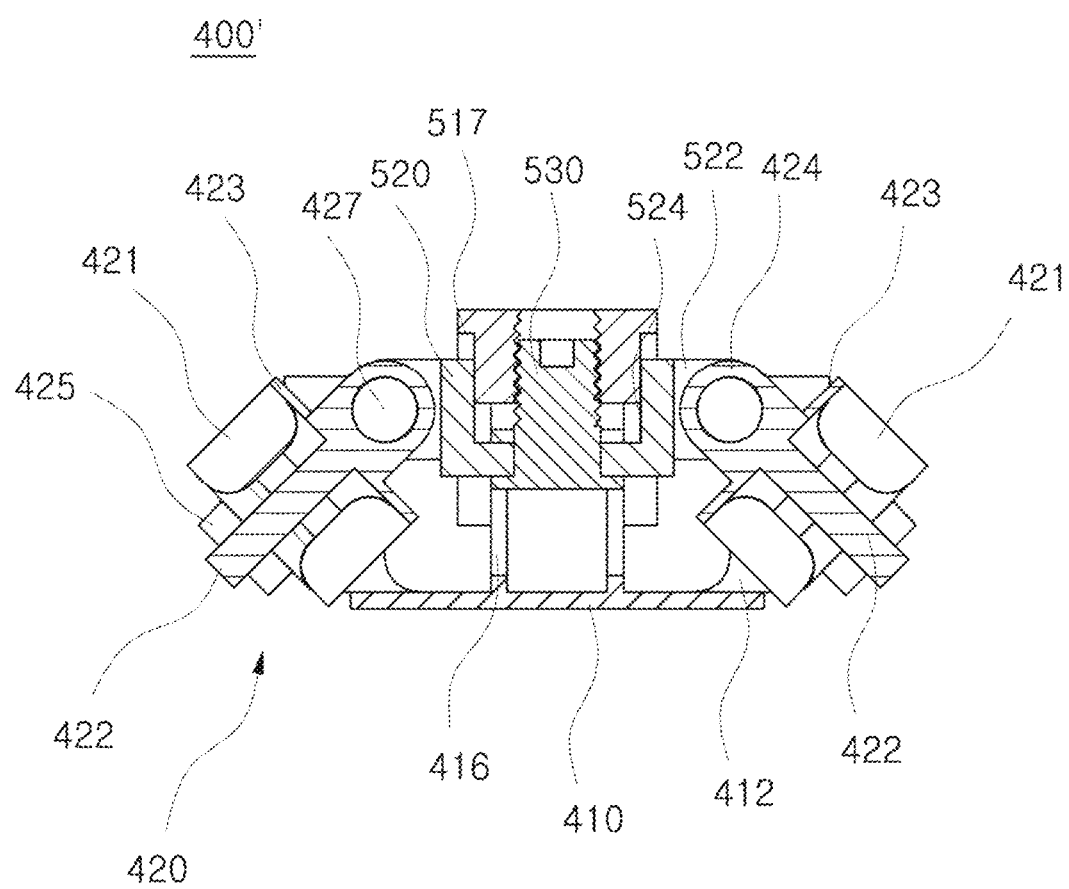
FIG. 12 is a cross-sectional view taken along line D-D in FIG. 10.
Figure 13:
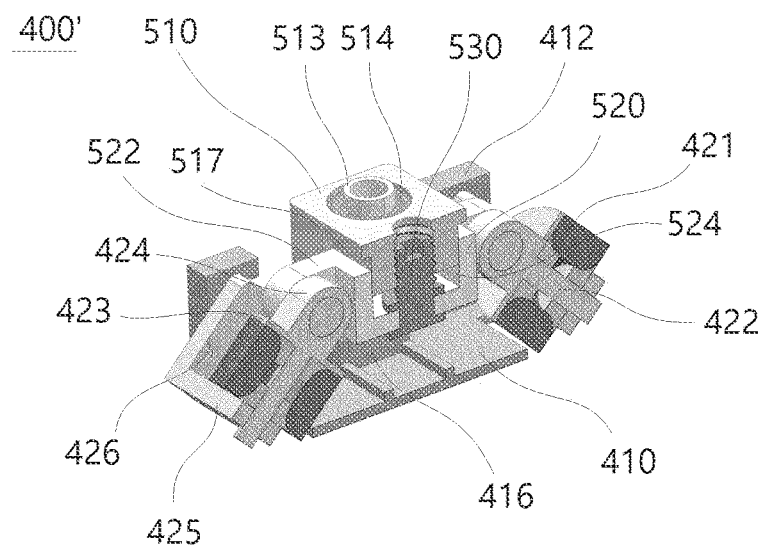
FIG. 13 is a perspective view of a cross-section taken along line D-D in FIG. 10.
Figure 14:
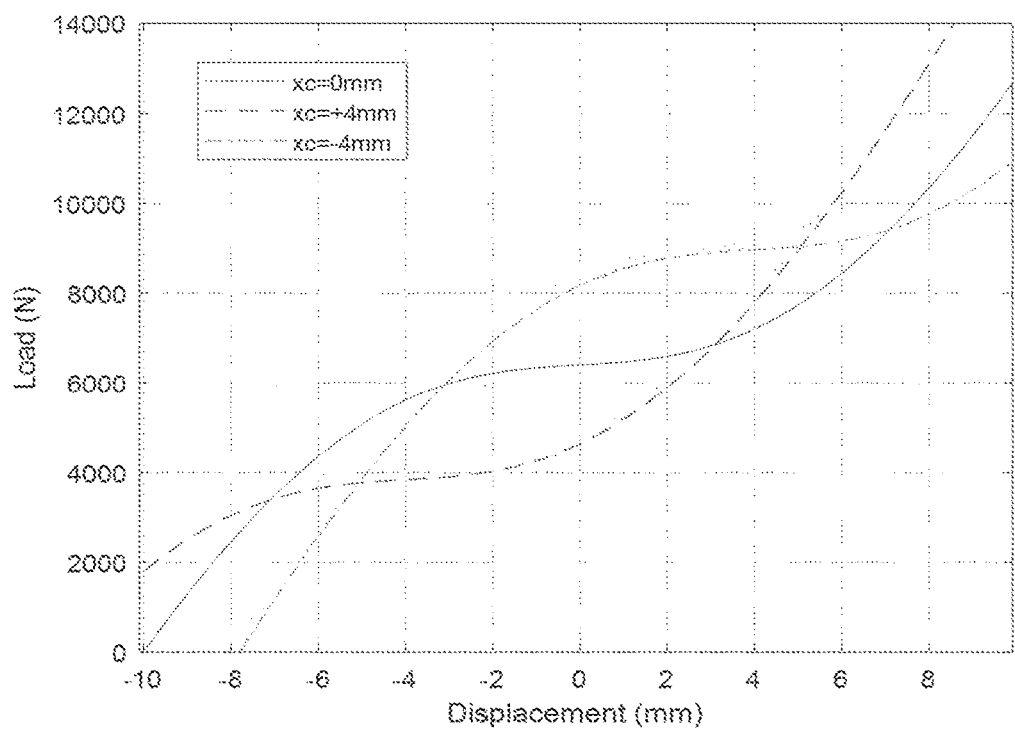
FIG. 14 is a load-displacement graph of the anti-vibration pallet according to the embodiment of FIG. 10.
Figure 15:
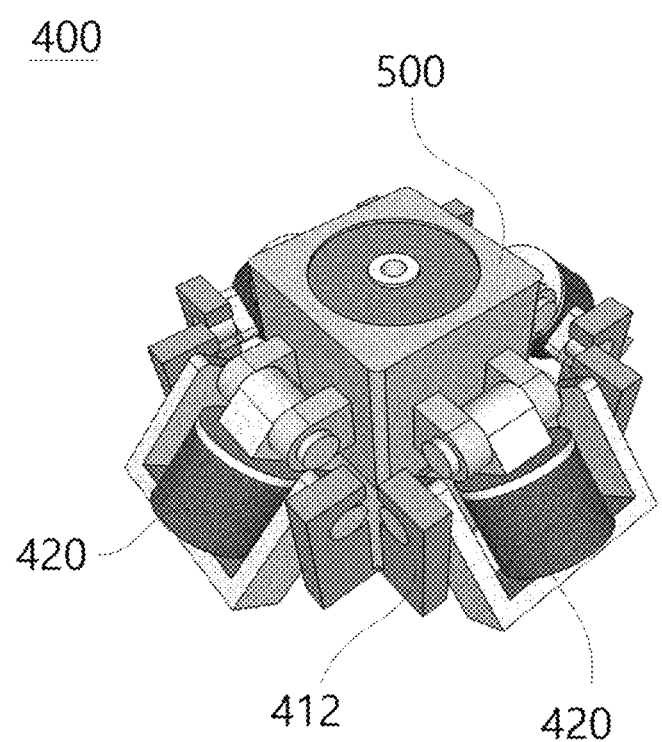
FIG. 15 is a perspective view illustrating a main mount according to still another embodiment of the present disclosure.
Figure 16:
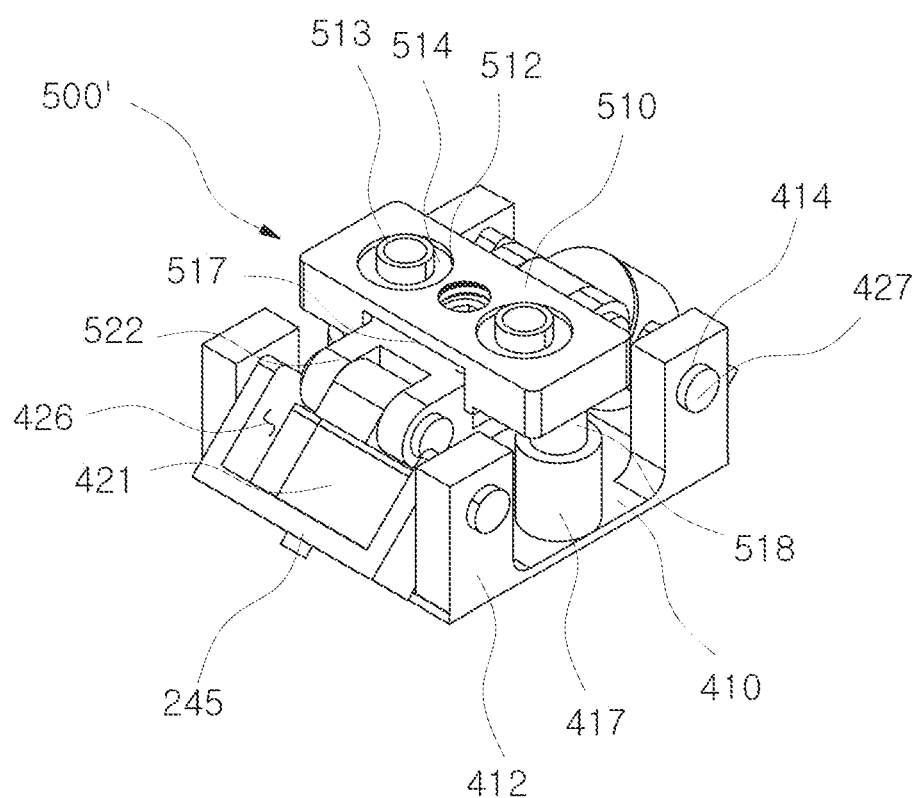
FIG. 16 is a perspective view illustrating a main mount according to yet another embodiment of the present disclosure.

FIG. 2 is a perspective view illustrating an anti-vibration pallet according to the present disclosure. FIG. is an exploded perspective view illustrating the anti-vibration pallet according to the present disclosure. FIG. 4 is a perspective view illustrating a main mount of the anti-vibration pallet according to an embodiment of the present disclosure. FIG. 5 is a cross-sectional view taken along line A-A in FIG. 4. FIG. 6 is a cross-sectional view taken along line B-B in FIG. 4. FIG. 7 is a cross-sectional view illustrating an auxiliary mount of the anti-vibration pallet according to the present disclosure. FIGS. 8(a) and 8(b) are views illustrating a state in which the main mount of the anti-vibration pallet according to the present disclosure is moved downward by a load. FIG. 9 is a load-displacement graph of the anti-vibration pallet according to the present disclosure. FIG. 10 is a perspective view illustrating a main mount according to another embodiment of the present disclosure. FIG. 11 is a cross-sectional view taken along line C-C in FIG. 10. FIG. 12 is a cross-sectional view taken along line D-D in FIG. 10. FIG. 13 is a perspective view of a cross-section taken along line D-D in FIG. 10. FIG. 14 is a load-displacement graph of the anti-vibration pallet according to the embodiment of FIG. 10. FIG. 15 is a perspective view illustrating a main mount according to still another embodiment of the present disclosure. FIG. 16 is a perspective view illustrating a main mount according to yet another embodiment of the present disclosure.

The present disclosure relates to an anti-vibration pallet. As illustrated in FIGS. 2 to 9, the anti-vibration pallet may have a configuration including: an upper plate 100 on which cargo is loaded on a top portion thereof; a lower plate 200 positioned below the upper plate 100 and seated on a floor; a main mount 400 installed between the lower plate 200 and the upper plate 100; and an auxiliary mount 300 installed outside the main mount 400.

Here, with a combination of the main mount 400 and the auxiliary mount 300, damage or breakage of cargo that is loaded on a top portion of the anti-vibration pallet of the present disclosure may be prevented by reducing vibration and shock that are applied to the cargo.

In addition, the main mount 400 may include: a support frame 410 installed on a top portion of the lower plate 200; an elevation block 500 installed below the upper plate 100; a support bracket 412 protruding upward from each of opposite sides of the support frame 410; and a main elastic unit 420 installed at the support bracket 412 and configured to elastically support the elevation block 500.

Here, the elevation block 500 may be directly installed at a bottom surface of the upper plate 100, and may be installed below a reinforcing frame 130 that is installed below the upper plate 100.

At this time, a longitudinal center portion of the main elastic unit 420 is hinge-coupled to an end of the support bracket 412 and an end of the main elastic unit 420 is hinge-coupled to a side portion of the elevation block 500, and the main elastic units 420 are installed symmetrically with respect to the elevation block 500, so that elastic forces applied from side directions are damped and only a vertical direction force remains.

That is, each of the main elastic units 420 may be installed to opposite sides of the elevation block 500 so as to be symmetrical to each other as illustrated in FIG. 4, the each main elastic unit 420 may be installed to four side surfaces of the elevation block 500 so as to be symmetrical to each other as illustrated in FIG. 15, or, even though not illustrated in drawings, the elevation block 500 may be formed in a polygonal shape and the each main elastic unit 420 may be installed to each side surface of the elevation block 500 so as to be symmetrical to each other.

Meanwhile, the main elastic unit 420 may include: an elastic support member 425 hinge-coupled to the support bracket 412; an elastic guide 422 formed in a bar shape having a first side formed to penetrate through the elastic support member 425 and having a second side hinge-coupled to the side portion of the elevation block 500; and a main elastic body 421 provided outside the elastic guide 422 and configured to elastically support the elevation block 500.

Here, a rotating shaft 427 protruding outward from both sides of the elastic support member 425 is formed, and a hinge hole 414 in which the rotating shaft 427 is inserted is formed at an upper end of the support bracket 412 such that the elastic support member 425 is rotatably installed.

Moreover, an elastic body accommodating portion 426 is formed at the elastic support member 425 so that the main elastic body 421 is accommodated therein, and a flange 423 is formed at the second side of the elastic guide 422 so as to support a first end of the main elastic body 421.

At this time, a first hinge bracket 522 is formed at the side of the elevation block 500, and a second hinge bracket 424 is formed at the end of the elastic guide 422. Therefore, the second hinge bracket 424 is hinge-coupled to the first hinge bracket 522 such that an elastic force of the main elastic body 421 is transferred to the elevation block 500, so that vibration and shock applied to cargo that is loaded on the top portion of the upper plate 100 are damped.

In addition, a nut 513 which is screwed to the upper plate 100 is installed on a top portion of the elevation block 500 and the nut 513 is installed to be movable horizontally, so that a horizontal vibration of cargo that is loaded on the anti-vibration pallet of the present disclosure is damped.

Here, a nut accommodating recess 512 recessed downward is formed on the top portion of the elevation block 500 such that the nut 513 is installed therein, and an inside of the nut 513 is provided with a fixing bolt 515 screwed to the nut 513. Moreover, a diameter of a bolt hole that is formed inside the nut 513 is formed to have a diameter larger than a threaded portion of the fixing bolt 515 and have a diameter smaller than a head portion of the fixing bolt 515 such that the nut 513 is installed to be movable horizontally.

At this time, an outside of the nut 513 is provided with a rubber bushing 514 such that vibration and shock are damped while the nut 513 is moved horizontally, so that vibration and shock of a horizontal direction applied to cargo loaded on the top portion of the upper plate 100 are damped.

Meanwhile, an elevation guide 416 protruding upward from a top surface of the support frame 410 is formed, and a guide protrusion 418 protruding outward from an upper end of the elevation guide 416 is formed.

Here, a lower portion of the elevation block 500 is opened and the elevation guide 416 is inserted into the elevation block 500, and a guide hole 516 formed in a long hole shape is formed through each of opposite sides of the elevation block 500.

Therefore, the guide protrusion 418 is inserted into the guide hole 516 such that the elevation block 500 is not shaken but is stably moved vertically by the guide protrusion 418 and the guide hole 516.

In addition, a plurality of the auxiliary mounts 300 are installed outside the main mount 400, wherein the auxiliary mounts 300 are installed symmetrically with respect to the main mount 400, so that the upper plate 100 is stably and elastically supported and so the upper plate 100 does not incline to one side.

Here, the auxiliary mount 300 includes: an auxiliary elastic body 310 configured to elastically support the upper plate 100; an upper fixing member 320 installed at an upper portion of the auxiliary elastic body 310 and fixed to the bottom surface of the upper plate 100; and a lower fixing member 330 installed at a lower portion of the auxiliary elastic body 310 and fixed to the top surface of the lower plate 200.

Here, the auxiliary elastic body 310 and the main elastic body 421 are formed of a spring, urethane, or the like, thereby providing an elastic force.

Meanwhile, with a combination of the main mount 400 and the auxiliary mount 300, the present disclosure acts as an air spring, and a correlation between a displacement and a load acting on the main elastic body 421 of the main mount 400 and the auxiliary elastic body 310 of the auxiliary mount 300 is illustrated in FIG. 9. In FIG. 9, K1 line illustrates the correlation graph of the main elastic body 421, K2 line illustrates the correlation graph of the auxiliary mount 310, and K1+K2 line illustrates the correlation graph of sum of the correlation graphs of K1 line and K2 line.

That is, in the graph illustrated in FIG. 9, a state in which a horizontal axis of the graph that defines a displacement is indicated to zero is a situation illustrated in FIG. 8(*a*) that is illustrating when a vertical displacement is zero. The displacement becomes minus number when the main mount 400 is moved upward, and becomes plus number when the main mount 400 is moved downward. In FIG. 9, a horizontal axis of graph defining a force that is sum of a load of a subject body and a horizontal directional force that the main elastic body 421 and the auxiliary elastic body 310 are applying to the load, so that the horizontal axis indicates plus number when the force is acting upward and indicates minus number when the force is acting downward.

To explain this in more detail, a position where the displacement, in which the displacement is indicated in an x-axis of the graph, is −10 represents a situation illustrated in FIG. 4, a position where the displacement is zero represents a situation illustrated in FIG. 8(*a*), and a position where the displacement is 10 represents a situation illustrated in FIG. 8(*b*).

That is, when a load is zero, both the main elastic body 421 and the auxiliary elastic body 310 are in a fully unfolded state that is as a position where the displacement, in which the displacement is indicated in the x-axis of the graph, is −10, and when a load increases, the main elastic body 421 and the auxiliary elastic body 310 are compressed, so that a force acts by elastic restoring forces of the elastic bodies 421 and 310.

At this time, a force of the auxiliary elastic body 310 only acts upward since the auxiliary elastic body 310 is installed vertically, so that the graph of the auxiliary elastic body 310 is illustrated in a straight line, but, as illustrated in FIG. 9, the graph of the main elastic body 421 is illustrated in a line with an angle changed as the auxiliary elastic body 310 is compressed. Forces acting horizontally offset by the main elastic body 310 installed symmetrically, and forces acting vertically becomes larger as the elastic bodies 421 and 310 are compressed, but a force directing upward decreases depending on an acting direction of a force, so that the graph is illustrated as a sine curve since the force decreases when the force passes a specific point.

Here, when the main elastic body 421 becomes horizontal as illustrated in FIG. 8(*a*), the vertical directional forces disappear, and the horizontal forces are offset to each other as illustrated in a position where the x-axis indicating the displacement is zero in FIG. 9. When a load becomes larger, which is a situation contrary to the above-described situation, a compression degree of the main elastic body 421 is relaxed so that acting force decreases but the direction of the force changed, so that the vertical directional force becomes larger and the force in a minus direction that is acting downward becomes larger. Moreover, when the main elastic body 421 passes the specific point, the force in the minus direction decreases since the compressed degree of the main elastic body 421 substantially decreases and the force acting downward decreases.

Therefore, the sum of the forces that the main elastic body 421 and the auxiliary elastic body 310 act vertically against a load illustrated as K1+K2 line is the same as the state of the air spring as illustrated in FIG. 1.

That is, when a state in which the x-axis indicating the displacement indicates zero is formed while the subject body is installed by properly adjusting a load or by adjusting elastic forces of the main elastic body 421 and the auxiliary elastic body 310 to be corresponded to the load, a slope of the graph that indicates a stiffness becomes nearly zero. Therefore, a lower bound of frequency bands capable of reducing vibration that is caused by the subject body becomes lower, so that a substantial low frequency vibration may be damped, which is as same as using the air spring.

Therefore, in the present disclosure, a vibration damping effect of the air spring may be realized by using only a combination of elastic bodies that are formed of a coil spring, urethane, or the like. Thus, there is no need of installing substantial auxiliary apparatuses that are added for installing the air spring, so that a cost may be dramatically reduced, structure thereof may be simplified, and also overall volume may be dramatically reduced.

Meanwhile, at the lower surface of the upper plate 100, a main cover 110 and an auxiliary cover 120 are installed by being positioned outside of the main mount 400 and the auxiliary mount 300, respectively, so that the main mount 400 and the auxiliary mount 300 are protected from shock applied from outside.

In addition, as another embodiment of the present disclosure that is illustrated in FIGS. 10 to 14, an elevation block 500' configuring a main mount 400' includes: a lower block 520 on which the first hinge bracket 522 is formed on each of opposite sides thereof; an upper block 510 provided at an upper portion of the lower block 520 and configured to be movable vertically; and an adjusting bolt 530 rotatably installed at the lower block 520 and screwed to the upper block 510 so as to control a height of the upper block 510.

Here, a block accommodating portion 524 is formed at a center portion of the lower block 520 so that a center portion of the upper block 510 is inserted in the block accommodating portion 524, and a guide groove 517 to which each of opposed side wall surfaces of the block accommodating portion 524 is inserted is formed in a vertical direction at each side of the center portion of the upper block 510.

Therefore, the upper block 510 is configured to move vertically along the block accommodating portion 524 by controlling the adjusting bolt 530, and a control hole (not shown) penetrating vertically so as to correspond at a position of the adjusting bolt 530 is formed on the upper plate 100, so that the height of the upper block 510 may be adjusted by inserting a tool such as a wrench, a screwdriver, or the like through the control hole (not shown).

Meanwhile, when the height of the upper block 510 is adjusted by controlling the adjusting bolt 530, a relation between the main elastic body 421 configuring the main mount 400' and the auxiliary elastic body 310 configuring the auxiliary mount 300 is changed, so that an optimal anti-vibration load depending on a resultant force of the main elastic body 421 and the auxiliary elastic body 310 can be changed.

That is, for example, as illustrated in FIG. 14, it can be seen that when the adjusting bolt 530 is controlled to move the upper block 510 4 mm upward, the optimal anti-vibration load is reduced, and when the adjusting bolt 530 is controlled to move the upper block 510 4 mm downward, the optimal anti-vibration load is increased.

Therefore, by controlling the adjusting bolt 530, a space between the upper block 510 and the lower block 520 may be adjusted such that the optimal anti-vibration load depending on a cargo load may be adjusted, so that an anti-vibration effect may be more improved since an additional anti-vibration pallet depending on a cargo load is not required to be provided.

In addition, as described above, the elevation block 500' may be stably movable vertically by a combination of the elevation guide 416, the guide protrusion 418, and the guide hole 516. Moreover, as still another embodiment of the present disclosure that is illustrated in FIG. 16, a guide rod 518 protrudes downward from each of opposite sides of the elevation block 500', that is, the each of opposite sides of the upper block 510, and a guide member 417 to which the guide rod 518 is slidably inserted protrudes upward from a top surface of the support frame 410.

Therefore, by the guide rod 518 being slidably movable vertically along the guide member 417, the elevation block 500' may be moved vertically without shaking.

Of course, the guide rod 518 and the guide member 417 may be applied to the main mount 400 of FIG. 4.

Although embodiments of the present disclosure were described above, the scope of the present disclosure is not limited thereto, the present disclosure may be modified in various ways by those skilled in the art without departing from the spirit of the present disclosure, and modifications substantially equivalent to the embodiments of the present disclosure are also included in the scope of the present disclosure.

INDUSTRIAL APPLICABILITY

The present disclosure relates to an anti-vibration pallet. More particularly, the present disclosure relates to an anti-vibration pallet that is capable of realizing an effect of an air spring by using only a combination of an auxiliary mount and a main mount that are formed of elastic bodies provided between an upper plate and a lower plate, and is also capable of maximizing an anti-vibration performance by controlling an optimal anti-vibration load according to a cargo load.

The invention claimed is:
1. An anti-vibration pallet comprising:
an upper plate on which cargo is loaded on a top portion thereof;
a lower plate positioned below the upper plate;
a main mount installed between the lower plate and the upper plate; and
an auxiliary mount installed outside the main mount, wherein the main mount comprises:
   a support frame installed on a top portion of the lower plate;
   an elevation block installed below the upper plate;
   a support bracket protruding upward from each of opposite sides of the support frame; and
   a main elastic unit having a center portion hinge-coupled to an end portion of the support bracket and having a first end portion hinge-coupled to a side portion of the elevation block.

2. The anti-vibration pallet of claim 1, wherein the main elastic unit comprises a plurality of main elastic units that are installed symmetrically with respect to the elevation block.

3. The anti-vibration pallet of claim 1, wherein the main elastic unit comprises:
an elastic support member hinge-coupled to the support bracket;
a main elastic body positioned at an elastic body accommodating portion that is formed inside the elastic support member;
an elastic guide installed through both the elastic body accommodating portion and the main elastic body;
a second hinge bracket formed at a first end portion of the elastic guide and hinge-coupled to a first hinge bracket that is protruding from the side portion of the elevation block; and
a flange formed below the second hinge bracket and configured to support a first end portion of the main elastic body.

4. The anti-vibration pallet of claim 3, wherein a nut accommodating recess is formed on a top portion of the elevation block and receives therein a nut that is screwed to the upper plate such that the nut is horizontally movable in the recess, and a rubber bushing is provided outside the nut.

5. The anti-vibration pallet of claim 3, wherein the elevation block comprises:
a lower block on which the first hinge bracket is formed on each of opposite sides thereof;
an upper block provided at an upper portion of the lower block and configured to be movable vertically; and
an adjusting bolt rotatably installed at the lower block and screwed to the upper block so as to control a height of the upper block.

6. The anti-vibration pallet of claim 5, wherein a block accommodating portion in which a center portion of the block is inserted to be movable vertically is formed at a center portion of the lower block, and a guide groove to which each of opposed side wall surfaces of the block accommodating portion is inserted is formed in a vertical direction at each side of the center portion of the upper block.

7. The anti-vibration pallet of claim 1, wherein an elevation guide inserted inside the elevation upper block is provided on a top surface of the support frame, a guide protrusion protruding outward is formed on an upper end of the elevation guide, and a guide hole having a long hole shape to which the guide protrusion is inserted is formed through each of opposite sides of the elevation block.

8. The anti-vibration pallet of claim 1, wherein a guide rod protrudes downward from each of opposite sides of the elevation block, and a guide member to which the guide rod is slidably inserted protrudes upward from a top surface of the support frame.

9. The anti-vibration pallet of claim 1, wherein the auxiliary mount comprises:
an auxiliary elastic body configured to elastically support the upper plate;
an upper fixing member installed at an upper portion of the auxiliary elastic body and fixed to a bottom surface of the upper plate; and
a lower fixing member installed at a lower portion of the auxiliary elastic body and fixed to a top surface of the lower plate.

10. The anti-vibration pallet of claim 1, wherein a main cover and an auxiliary cover are installed at a lower surface of the upper plate such that the main cover and the auxiliary cover are positioned outside the main mount and the auxiliary mount, respectively.

\* \* \* \* \*